United States Patent
Adcock et al.

(10) Patent No.: US 8,117,544 B2
(45) Date of Patent: Feb. 14, 2012

(54) SYSTEM AND METHOD FOR DETECTING USER ACTIONS IN A VIDEO STREAM

(75) Inventors: John E. Adcock, Menlo Park, CA (US); Laurent Denoue, Palo Alto, CA (US); Jonathan J. Trevor, Santa Clara, CA (US); David M. Hilbert, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 832 days.

(21) Appl. No.: 10/973,198

(22) Filed: Oct. 26, 2004

(65) Prior Publication Data

US 2006/0090134 A1    Apr. 27, 2006

(51) Int. Cl.
*G06F 9/00* (2006.01)

(52) U.S. Cl. .......... 715/719; 715/856; 715/857; 715/863

(58) Field of Classification Search .......... 715/719–726, 715/760, 501.1; 709/231, 232
See application file for complete search history.

(56) References Cited

U.S. PATENT DOCUMENTS

| | | | | |
|---|---|---|---|---|
| 5,708,845 A * | 1/1998 | Wistendahl et al. | .......... | 715/202 |
| 5,900,872 A * | 5/1999 | Ashe | .......... | 715/786 |
| 6,346,933 B1 | 2/2002 | Lin | | |
| 6,642,939 B1 * | 11/2003 | Vallone et al. | .......... | 715/721 |
| 7,096,427 B2 * | 8/2006 | Van De Streek et al. | .......... | 715/719 |
| 7,099,953 B2 * | 8/2006 | Horiuchi et al. | .......... | 709/231 |
| 2001/0012025 A1 * | 8/2001 | Wojaczynski et al. | .......... | 345/856 |
| 2004/0021684 A1 * | 2/2004 | B. Millner | .......... | 345/719 |
| 2004/0233233 A1 * | 11/2004 | Salkind et al. | .......... | 345/719 |
| 2005/0044489 A1 * | 2/2005 | Yamagami et al. | .......... | 715/517 |
| 2005/0108645 A1 * | 5/2005 | Prentice et al. | .......... | 715/722 |
| 2006/0070107 A1 * | 3/2006 | Renkis | .......... | 725/105 |
| 2006/0095867 A1 * | 5/2006 | Rogalski et al. | .......... | 715/858 |

FOREIGN PATENT DOCUMENTS

| | | |
|---|---|---|
| JP | 2000222130 | 8/2000 |
| JP | 2001125738 | 5/2001 |
| JP | 2002132438 | 5/2002 |
| JP | 5-224863 | 10/2010 |

OTHER PUBLICATIONS

Knowing the user's every move: Richard Atterer, Monika Wnuk, Albrecht Schmidt, Publisher: ACM, May 2006.*
Olsen, Jr., Dan R., et al., "Laser pointer interaction," Proceedings of the SIGCHI Conference on Human Factors in Computing Systems, 2001, pp. 17-22, Seattle, Washington, United States, http://doi.acm.org/10.1145/365024.365030.

(Continued)

*Primary Examiner* — William Bashore
*Assistant Examiner* — Meseker Takele
(74) *Attorney, Agent, or Firm* — Fliesler Meyer LLP

(57) ABSTRACT

Embodiments of the present invention include a video server that can detect and track the image of a pointing indicator in an input video stream representation of a computer display. The video server checks ordered frames of the video signal and determines movements for a pointing indicator such as a mouse arrow. Certain motions by the pointing indicator, such as lingering over a button or menu item or circling a button or menu item can provoke a control action on the server.

34 Claims, 8 Drawing Sheets

OTHER PUBLICATIONS

Cheng, Kelvin, et al., "Direct interaction with large-scale display systems using infrared laser tracking devices," Proceedings of the Australian Symposium on Information Visualisation, 2003, pp. 67-74, Adelaide, Australia.

Kang, Jinman, et al., "Multi-views tracking within and across uncalibrated camera streams," First ACM SIGMM International Workshop on Video Surveillance, Nov. 2003, pp. 21-23, Berkeley, California, United States, http://doi.acm.org/10.1145/982452.982456.

Yu, Xinguo, et al., "Trajectory-based ball detection and tracking with applications to semantic analysis of broadcast soccer video," Proceedings of the 11th ACM International Conference on Multimedia, Nov. 2003, pp. 11-20, Berkeley, California, United States, http://doi.acm.org/10.1145/957013.957018.

Suetens, Paul, et al., "Computational strategies for object recognition," ACM Computing Surveys, vol. 24, No. 1, Mar. 1992, pp. 5-62, http://doi.acm.org/10.1145/128762.12876.

Japanese Office Action in connection Application No. JP-2005-311795 dated Sep. 21, 2010 (with English Translation).

* cited by examiner

SYSTEM AND METHOD FOR DETECTING USER ACTIONS IN A VIDEO STREAM

BACKGROUND OF THE INVENTION

1. Field of the Invention

The present invention relates generally to processing user input. More particularly it relates to detecting pointer device actions within a video stream and interpreting motions of said pointer device to initiate commands.

2. Description of the Related Art

In modern business environments a greater amount of emphasis has been placed on the transfer and exchange of information. This emphasis has resulted in a large number of presentation applications that are used to display presentations on video output devices such as computer displays and projectors. However, these systems often lack convenient and robust mechanisms for capturing, modifying, or controlling the video stream during these presentations.

Some solutions have evolved to intercept, capture, and optionally modify the video content during presentation, however doing so usually requires a separate video proxy system that can capture, modify, and reproduce the video stream. However controlling such systems typically requires that the presenter have both input and output access to the proxy system, which entails a display and mouse connected to the proxy. Such setups are often cumbersome and difficult to configure.

What is needed is a video proxy system that can accept user commands from within the intercepted video stream without the need for separate controls.

SUMMARY OF THE INVENTION

Embodiments of the present invention include a video proxy server that can detect user commands from an input video stream by interpreting position and movement of a pointing indicator. The proxy checks ordered frames of the video signal and determines movements for a pointing indicator such as a mouse arrow. Certain motions by the pointing indicator can provoke a control action.

BRIEF DESCRIPTION OF THE DRAWINGS

Preferred embodiments of the present invention will be described in detail based on the following figures, wherein.

DETAILED DESCRIPTION OF THE INVENTION

Embodiments of the present invention include a video proxy server that can detect user commands from an input video stream by interpreting position and movement of a pointing indicator. The proxy checks ordered frames of the video signal and determines movements for a pointing indicator such as a mouse arrow. Certain motions by the pointing indicator can provoke a control action. These motions can be associated with or independent of an overlaid interface element generated by the proxy server.

In an alternate embodiment, the video stream of a computer display is captured and the position and movement of the pointing indicator are tracked for monitoring purposes. The pointer tracking information may be used to perform surveillance or monitoring of the actions performed on the computer, either independently or in concert with other video or image analysis techniques to determine the use and content of application windows in the video stream.

Figure 1:
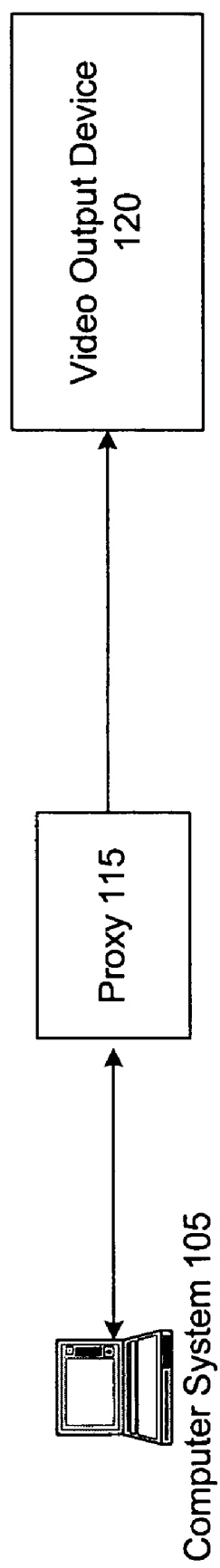
FIG. 1 illustrates one embodiment of the interaction among a computer system, a video proxy system, and a video output device.

FIG. 1 illustrates one embodiment of the interaction among a computer system, a video proxy system, and a video output device. A computer system 105, such as a laptop computer, desktop computer, tablet system, or any other type of computer output, is connected to a proxy 115. The computer system 105 transmits an output video signal to the proxy 115, which optionally modifies the video signal and passes it to the display device 120. The video signal can be digital or analog and can include any number of formats. In an alternate embodiment, the video stream is not passed through the proxy, but is first passed to a splitter that sends one signal to the proxy 115 and one to the display device 120.

While in some embodiments, the video signal is a conventional analog or digital video signal, in alternate embodiments, the video signal is a data stream transmitted over a wired or wireless network.

The display device 120 is a device used to display the video output to viewers of the presentation. The display device can be a Liquid Crystal Display (LCD) projector, analog projector, a Cathode Ray Tube (CRT) display, an LCD display or any other type of display. The display device 120 can be attached to a network system that receives a video data stream and converts it to a direct video signal The proxy 115 can be a specialized computer or a conventional computer running specialized software. The proxy 115 captures the video stream output from the computer system 105 and optionally modifies it before directing it to video output device 120. The proxy 115 is configured to detect the presence, position, and motion of a pointing indicator in the video stream, such as a mouse, and detect user commands according to the motion of the pointing device.

Figure 2:
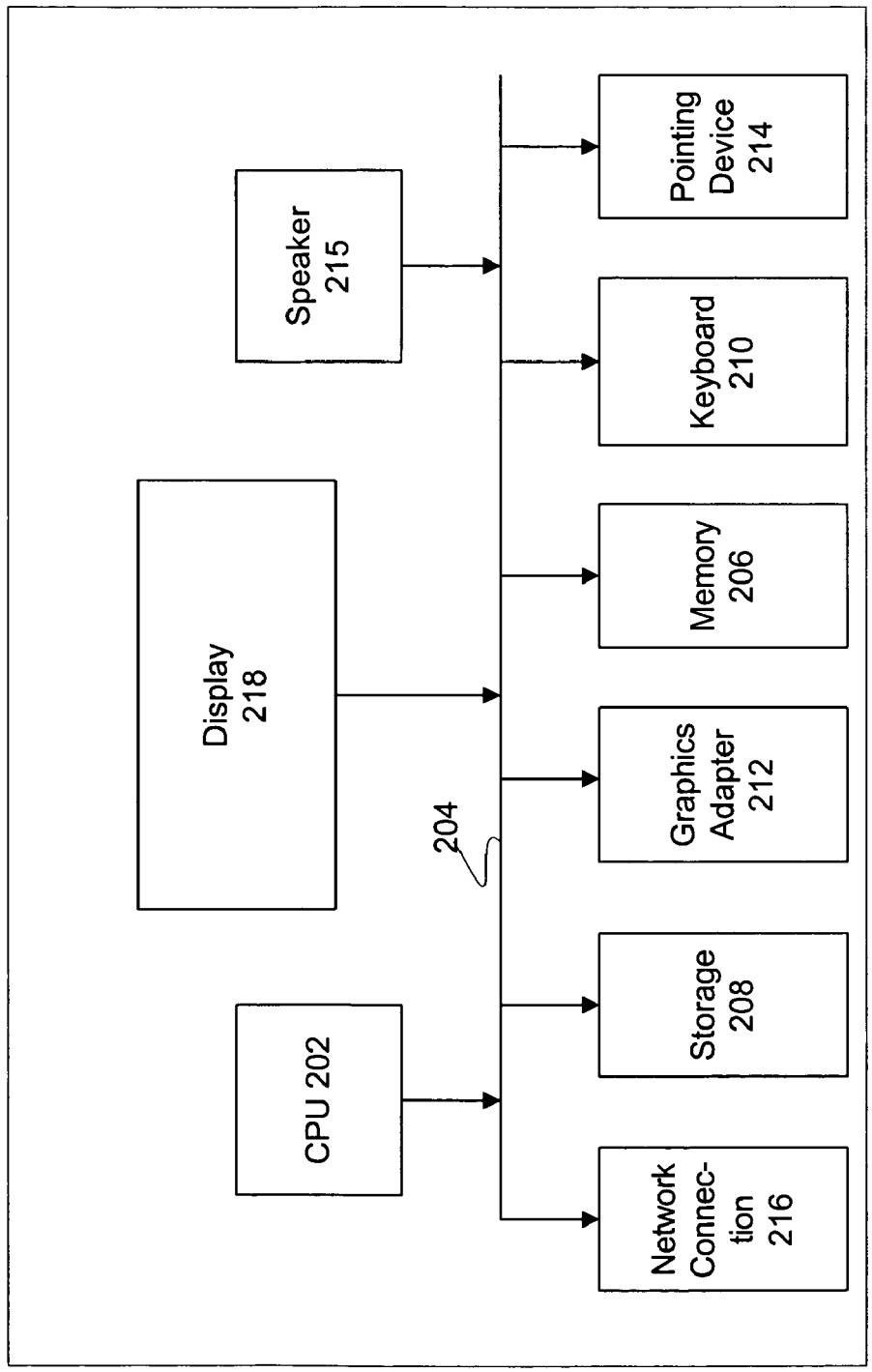
FIG. 2 illustrates one embodiment of the computer system.

FIG. 2 illustrates one embodiment of the computer system 115. The system includes a processor 202. There may be more than one processor 202. Also coupled to the bus 204 are a memory 206, a storage device 208, a keyboard 210, a graphics adapter 212, a pointing device 214, a speaker 215, and a network adapter 216. A display 218 is coupled to the graphics adapter 212.

The processor 202 may be any specific or general-purpose processor such as an INTEL x86 or POWERPC-compatible central processing unit (CPU). The storage device 208 may be any device capable of holding large amounts of data, such as a hard drive, compact disk read-only memory (CD-ROM), DVD, or some other form of fixed or removable storage device.

Figure 3:
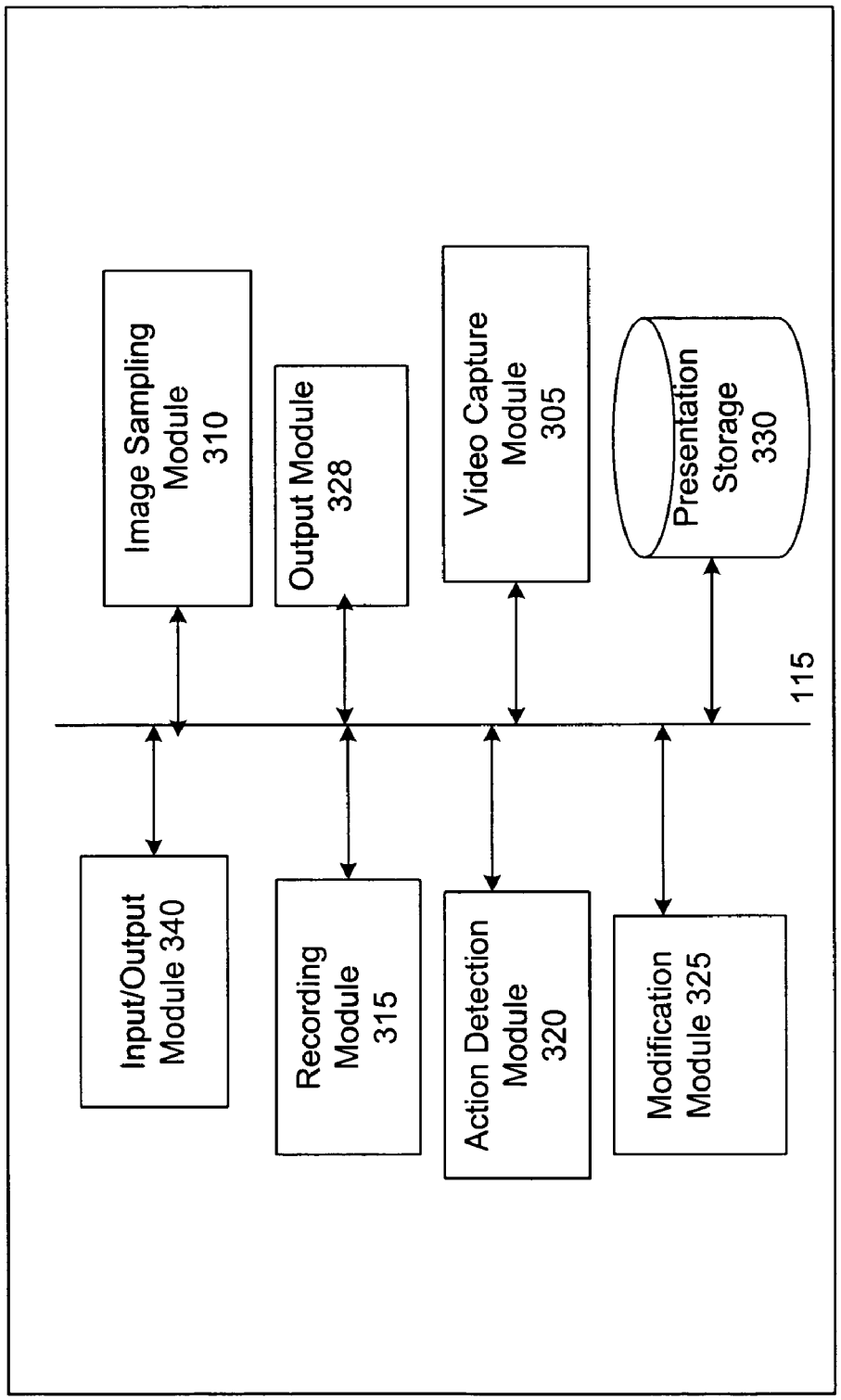
FIG. 3 illustrates a more detailed view of the video proxy system.

FIG. 3 illustrates a more detailed view of the video proxy system 115. The components of the video proxy system 115 may be implemented through any combination of hardware, software, and firmware. An input/output module 330 is used to generate an interface for configuring the video proxy system 115. The interface can be a console interface on the video proxy 115 itself, a graphical user interface that is accessed through input/output devices such as a keyboard and monitor that are connected to the media system, or a web interface that is accessed over a network A video capture module 305 receives the video signal from the splitter 110 or computer system 105. The image sampling module 310 generates a series of images from the video captured by the video capture module 305. The action detection module 320 compares the images generated by the image sampling module 310 to determine motion by the pointing indicator.

If the action detection module 320 detects motion by the pointing indicator, it can determine whether the motion is indicative of a control request, though in some embodiments, the action detection module is configured merely to track the behavior of the pointing indicator and does not attempt to detect control requests. If it detects a control request, it directs the modification module 325 to modify the video stream as per the control request or otherwise modifies the functionality of the video proxy. The control requests can include changes to the video, addition of overlays to the video, and control commands for the video proxy (stop/start recording).

A recording module 315 can optionally record the modified video stream and/or the original video stream on the presentation storage 330. An output module 328 transmits the modified video stream to the video output device 120.

Figure 4:
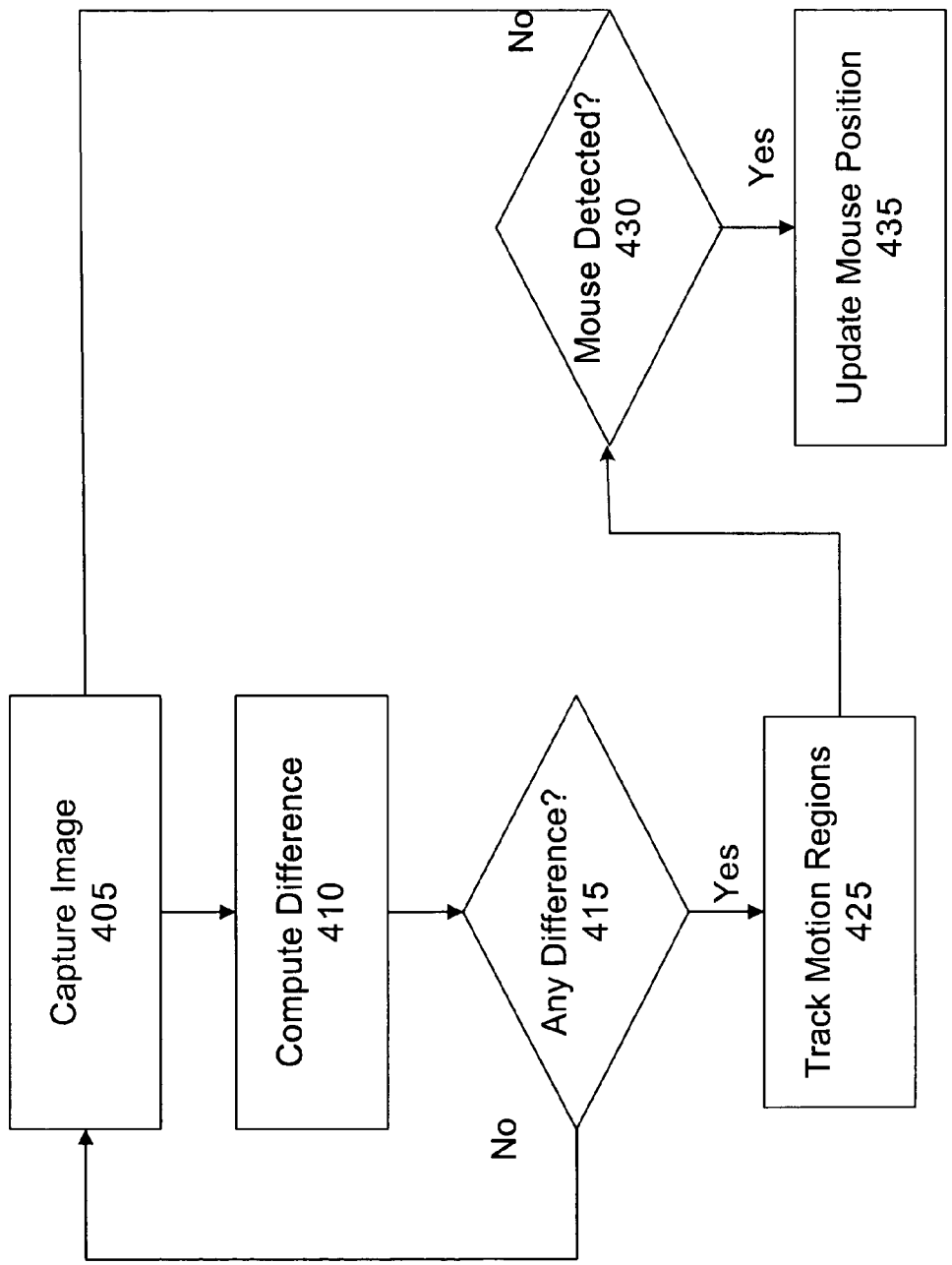
FIG. 4 illustrates one embodiment of a process for mouse movement tracking.

FIG. 4 illustrates one embodiment of a process for mouse movement tracking. The action detection module maintains an internal representation of a mouse position on a frame by frame basis. The internal representation includes X and Y coordinates for the pointing indicator for each image. The images are stored in association with a timestamp allowing for the measurement of mouse movements over time. The process below is one embodiment of how the internal representation is updated.

In step 405 the image sampling module 310 captures an image from the video stream received through the video capture module. In step 410, the action detection module 320 compares the image to a previously captured image. The previously captured image is an image that was captured from the video at a predetermined time margin before (e.g. 0.2 seconds).

In step 415 the image detection module 320 determines whether there is a difference between the two images. In some embodiments, any difference results in a positive determination, in alternate embodiments, the difference must be larger than a predetermined amount and/or selected differences are filtered. If no difference is detected, the process returns to step 405.

If there are difference detected, in step 425 the image detection module 320 checks in greater detail the regions of the image that have changed. In step 430 the action detection module 320 determines whether a mouse arrow or other pointing indicator is detected in the changed region of the image.

If the pointing indicator is not detected, the process returns to step 405. If the pointing indicator is detected the action detection module 320 upgrades its internal representation of the location of the pointing indicator.

In some embodiments, the motions detected with respect to FIG. 4 are more complicated pointer actions, such as those discussed below and are accepted with respect to an overlaid interface generated by the proxy. In alternate embodiments, the motions are independent of any overlays and can be simple motions that remove the proxy from a rest state or resume/pause recording by the proxy. For example, a shaking motion of the pointing indicator can indicate a command to exit a rest state.

Figure 5:
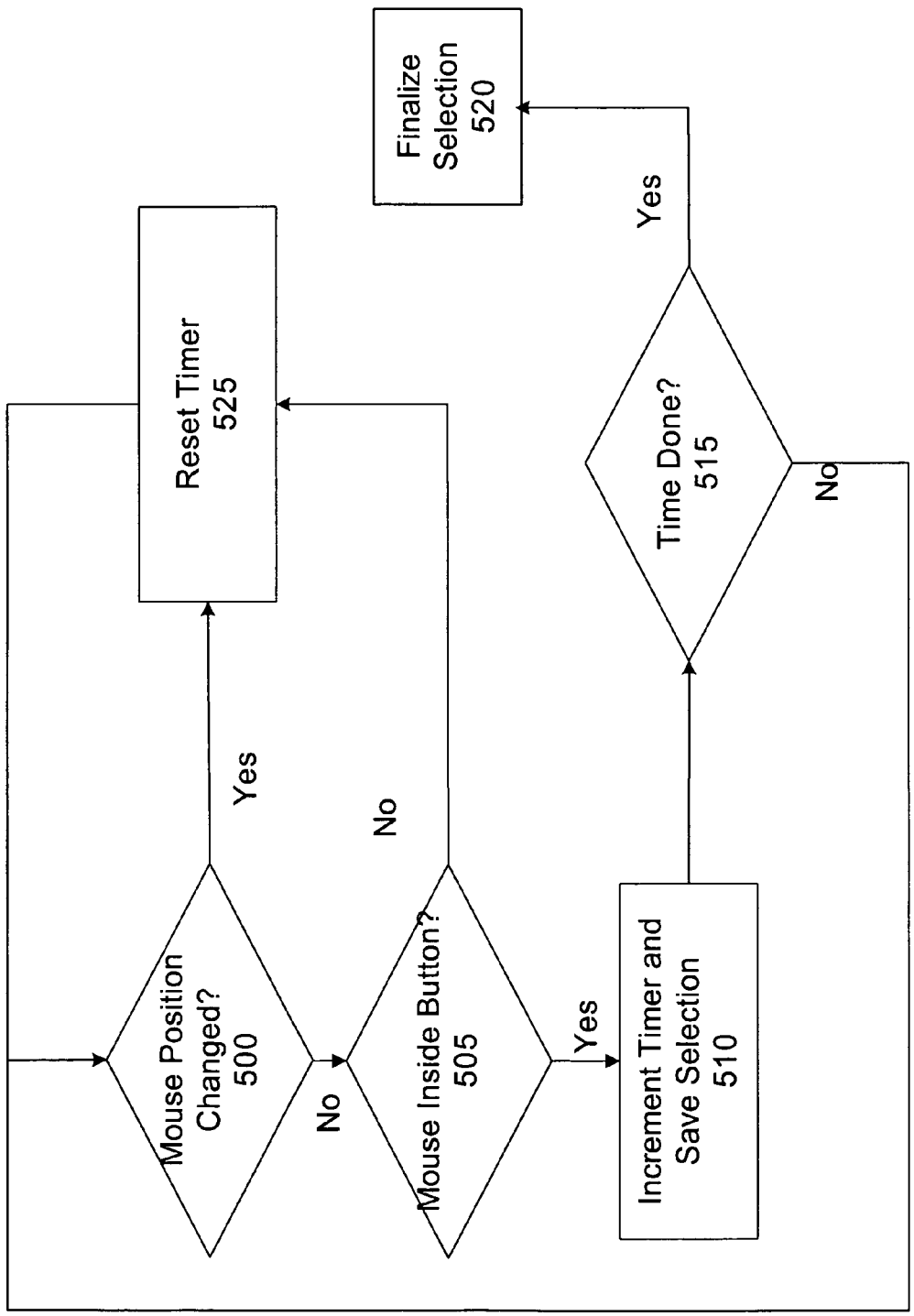
FIG. 5 is a flow chart illustrating one embodiment of a process for detecting a command from pointer motions.

FIG. 5 is a flow chart illustrating one embodiment of a process for detecting a request from a pointing indicator residing over a button or graphic. This process is particularly useful because it does not require a high level of user involvement. A user can move the pointing indicator over an icon and leave it in that position.

Figure 7:
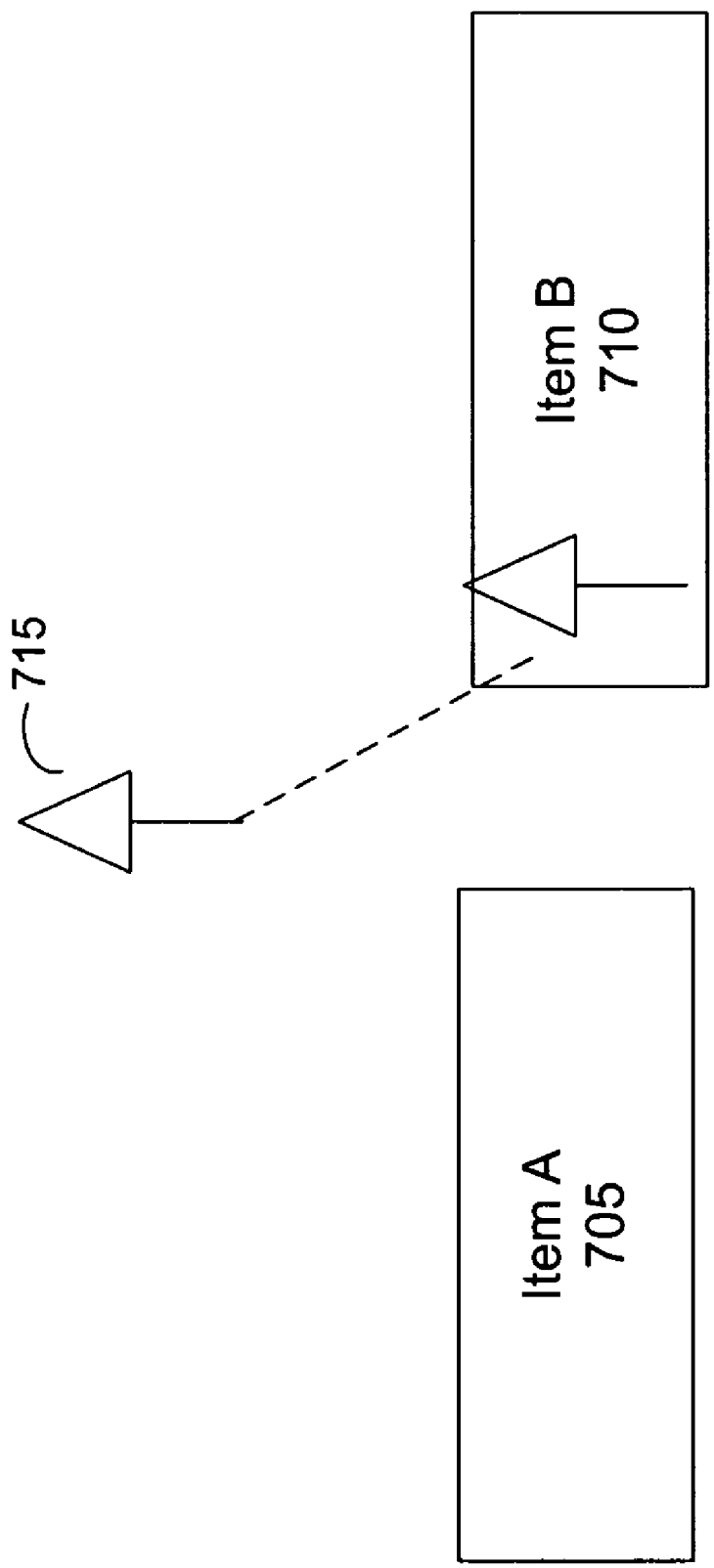
FIG. 7 illustrates one embodiment of pointer motions that can provoke an action by the video proxy server.

In step 500 the action detection module determines if the pointing indicator has changed position during a fixed period of time, as measured by a timer. Referring to FIG. 7, this step particularly refers to whether the pointing indicator 715 has moved off the button or icon 705. In some embodiments, the icon 705 is generated by the video proxy and presented as an overlay to the video stream.

In one embodiment, step 500 is performed through the process of FIG. 4. If the pointing indicator position has not changed a timer is reset in step 525 and step 500 is repeated.

If the pointing indicator 715 position has changed, the action detection module 320 determines in step 505 whether the pointing indicator is over an icon or button. If the pointing indicator is over the icon or button 705, in step 510 the timer is incremented. In step 515 the action detection module 320 determines whether the time as measured by the timer is over a predetermined time limit. This limit can be preset or user configurable.

If the time is under the time limit, the process returns to step 500, where the system again checks whether the pointing indicator has moved. If time has reached the limit, in step 520, the system finalizes the selection and initiates the request associated with the selection operation.

Figure 6:
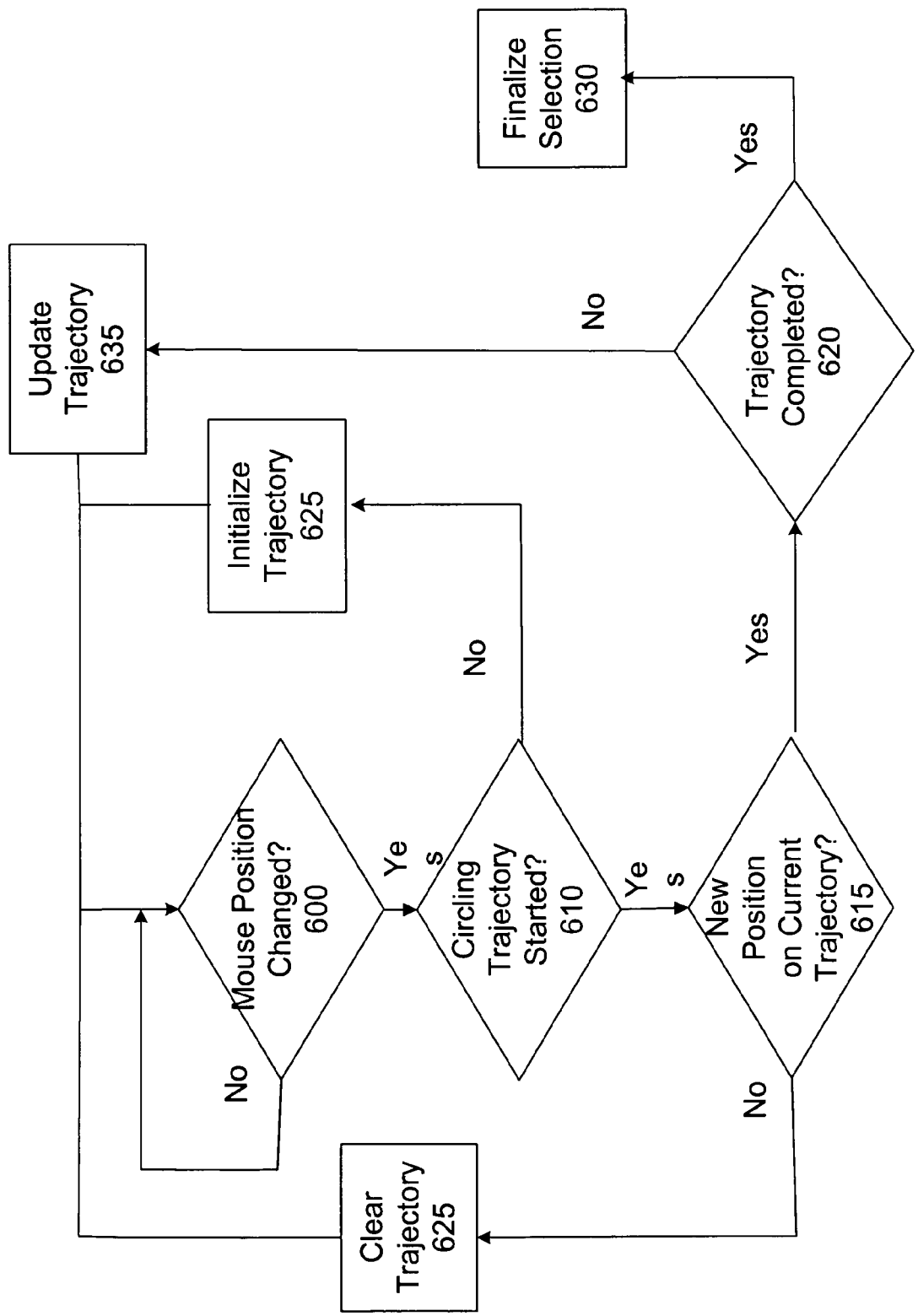
FIG. 6 is a flow chart illustrating an alternate process for detecting commands from pointer motions.
Figure 8:
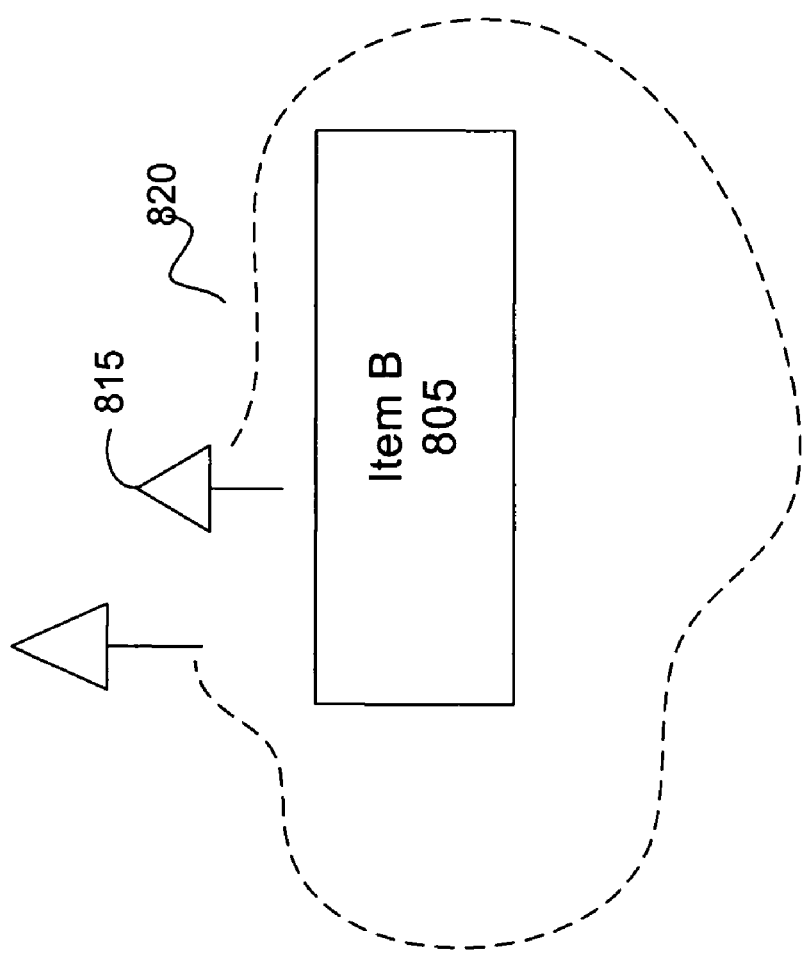
FIG. 8 illustrates an additional embodiment of pointer motions that can provoke an action by the video proxy server.

FIG. 6 is a flow chart illustrating an alternate process for detecting requests from pointer motions. This process pertains particularly to detecting a circular motion by the pointing indicator 815 around an icon 805 as illustrated in FIG. 8. This process is particularly useful for its lack of false positives, as it is unlikely that a user will initiate this type of action accidentally.

In step 600, the action detection module determines if the pointing indicator 805 position has changed. In one embodiment this determination is made according to the process illustrated in FIG. 4. If the pointing indicator position has not changed, the process returns to step 600. In step 610 the system determines whether the pointing indicator is currently in the midst of a circular trajectory around the icon 805. The action detection module 320 maintains an indicator of whether the pointing indicator is being moved in a circular trajectory. If the pointing indicator is not currently in the midst of circular trajectory, a new trajectory is initialized in step 625 and the system repeats step 600.

If the pointing indicator is currently in the midst of a circular trajectory, the system determines in step 615 whether it has moved to a new point on a circular trajectory. In some embodiments, there is a permitted tolerable deviation from a pure circular trajectory, allowing for imperfect circles. If the pointing indicator has deviated sufficiently from the circular trajectory 820, in step 625 the trajectory is cleared from the internal representation and the process returns to step 600.

If the pointing indicator continues to be moved in a circular trajectory, in step 620 the action detection module determines whether the trajectory has been completed. In some embodiments, the system requires that the circle be closed, in alternate embodiments, the end point of the trajectory has to be within a certain minimum distance of the starting point.

If the trajectory is not complete, in step 635 the trajectory is updated and the process returns to step 600. If the trajectory is complete, in step 630 the system finalizes the selection and initiates the modification request associated with the circling operation.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A method for identifying and tracking a pointing indicator in an input video stream, the method comprising:
    receiving an input video stream of a computer display from a client computer at a video proxy device, wherein the video proxy device sends an output video stream to a display device;
    extracting a plurality of frames from the received the input video stream, each frame being located at a predetermined time before a previous frame in the input video stream;
    detecting coordinates indicative of a position of a graphical pointing indicator in each of the plurality of frames from the input video stream during presentation of the input video stream at the video proxy device, wherein the graphical pointing indicator is within the input video stream and is controlled from the client computer;
    detecting movement of the graphical pointing indicator among the plurality of frames during presentation of the input video stream at the video proxy device, wherein detecting movement of the graphical pointing indicator at the video proxy device includes
        maintaining coordinates of the graphical pointing indicator for each of the plurality of frames,
        storing the coordinates of the graphical pointing indicator for each frame,
        comparing, for each frame, the stored coordinates of the graphical pointing indicator, wherein the position of the graphical pointing indicator for one of the plurality of frames is compared to a subsequent one of the plurality of frames, and
        wherein a particular detected movement of the graphical pointing indicator, controlled from the client computer, invokes control actions executed by the video proxy device, and wherein the control actions include making at least one change to the output video stream;
    determining when the graphical pointing indicator is moving in a particular trajectory relative to an item shown in the input video stream;
    determining that the graphical pointing indicator has completed the particular trajectory and identifying a control action associated with the particular trajectory;
    executing the control action to produce the output video stream; and
    sending the output video stream to the display device.

2. The method of claim 1, wherein the video proxy device gathers user input by detecting position of a client machine's cursor in the input video stream.

3. The method of claim 2, wherein the video proxy device presents a graphical interface to a user by overlaying interface elements on the input video stream sent to the display device.

4. The method of claim 3, wherein the video proxy displays its own cursor image as part of the graphical interface presented to the user.

5. The method of claim 3, wherein detecting the position of the graphical pointing indicator enables the user to control disabling or enabling presentation recording, restarting the proxy machine, and configuration details of the proxy machine.

6. The method of claim 3, wherein the graphical user interface presented by the video proxy is controlled using mouse movements.

7. The method of claim 2, wherein the video proxy device presents a graphical interface to a user by replacing the input video stream sent to the display device.

8. The method of claim 1, wherein the video proxy identifies changing image regions in the input video stream by computing the pixel by pixel difference between sequentially captured frames.

9. The method of claim 8, wherein the video proxy detects presence of a cursor image as it travels across the desktop or application window by tracking changing areas of the input video stream.

10. The method of claim 9, wherein the video proxy limits a portion of the input video stream that is searched to regions that are changing.

11. The method of claim 10, wherein the cursor is detected through image-difference analysis when the image change is due to cursor movement.

12. The method of claim 11, wherein the video proxy determines whether a single region of image motion closely matches expected size and speed of a cursor.

13. The method of claim 1, wherein a set of options is presented to the user as buttons or regions that delimit different choices.

14. The method of claim 13, wherein the user makes a selection by moving the cursor into a region corresponding to a desired choice and leaving the cursor still for a prescribed duration.

15. The method of claim 1, wherein user commands are detected according to the motion of the graphical pointing indicator.

16. The method of claim 1, further comprising:
    detecting whether the graphical pointing indicator is over a region corresponding to a desired choice for a predetermined time; and
    initiating an operation associated with the desired choice when the graphical pointing indicator is over the region for the predetermined time.

17. The method of claim 1 wherein the at least one change to the video stream includes one or more of adding overlays to the video stream and executing video proxy commands.

18. A system for processing an input video stream comprising:
    a video capture module at a video proxy device configured to receive an input video stream of a computer display from a client computer, wherein the video proxy device executes on a computer having a computer readable storage medium and a processor operating thereon, and wherein the video proxy device sends an output video stream to a display device;
    an image sampling module, executing on the video proxy device, configured to extract a plurality of frames from the received input video stream, each frame being located at a predetermined time before a previous frame in the input video stream;
    an image processing module, executing on the video proxy device, configured to
        detect coordinates indicative of a position of a graphical pointing indicator in each of the plurality of frames from the input video stream during presentation of the input video stream at the video proxy device, wherein the graphical pointing indicator is within the input video stream and is controlled from the client computer,
        detect movement of the graphical pointing indicator among the plurality of frames during presentation of the input video stream at the video proxy device, wherein detecting movement of the graphical pointing indicator at the video proxy device includes maintaining coordinates of the graphical pointing indicator for each of the plurality of frames,
        storing the coordinates of the graphical pointing indicator for each frame in the computer readable storage medium,
        comparing, for each frame, the stored coordinates of the graphical pointing indicator, wherein the position of the graphical pointing indicator for one of the plurality of frames is compared to a subsequent one of the plurality of frames, and
        wherein a particular detected movement of the graphical pointing indicator, controlled from the client computer, invokes control actions executed by the video proxy device, and wherein the control actions include making at least one change to the output video stream;
    an action detection module, executing on the video proxy device, configured to
        determine when the graphical pointing indicator is moving in a particular trajectory relative to an item shown in the input video stream,
        determine that the graphical pointing indicator has completed the particular trajectory and identify a control action associated with the particular trajectory, and
        execute the control action to produce the output video stream; and
    a video output module, executing on the video proxy device, wherein the video output module sends the output video stream to a display device.

19. The system of claim 18, wherein the video proxy device gathers user input by detecting a position of a client machine's cursor in the input video stream.

20. The system of claim 19, wherein the video proxy device presents a graphical interface to a user by overlaying interface elements on the input video stream sent to the display device.

21. The system of claim 20, wherein the video proxy displays its own cursor image as part of the graphical interface presented to the user.

22. The system of claim 20, wherein determining the location of the graphical pointing indicator enables the user to control disabling or enabling presentation recording, restarting the proxy machine, and configuration details of the proxy machine.

23. The system of claim 20, wherein a graphical user interface presented by the video proxy is controlled using mouse movements.

24. The system of claim 19, wherein the video proxy device presents graphical interfaces to a user by replacing the input video stream sent to the display device.

25. The system of claim 18, wherein the video proxy identifies changing image regions in the input video stream by computing a pixel by pixel difference between sequentially captured frames.

26. The system of claim 25, wherein the video proxy detects the presence of a cursor image as it travels across the desktop or application window by tracking changing areas of the input video stream.

27. The system of claim 26, wherein the video proxy limits a portion of the input video stream that is searched to regions that are changing.

28. The system of claim 27, wherein the cursor is detected through image-difference analysis when image change is due to cursor movement.

29. The system of claim 28, wherein the video proxy determines whether a single region of image motion closely matches the expected size and speed of a cursor.

30. The system of claim 18, wherein a set of options is presented to the user as buttons or regions that delimit different choices.

31. The system of claim 30, wherein the user makes a selection by moving the cursor into a region corresponding to a desired choice and leaving the cursor still for a prescribed duration.

32. The system of claim 18, wherein user commands are detected according to the motion of the graphical pointing indicator.

33. The system of claim 18, wherein the action detection module is configured to:
    detect whether the graphical pointing indicator is over a region corresponding to a desired choice for a predetermined time; and
    initiate an operation associated with the desired choice when the graphical pointing indicator is over the region for the predetermined time.

34. The system of claim 18 wherein the at least one change to the video stream includes one or more of adding overlays to the video stream and executing video proxy commands.

* * * * *